US012458608B2

United States Patent
Wall (10) Patent No.: US 12,458,608 B2
(45) Date of Patent: Nov. 4, 2025

(54) N-ACETYLCYSTEINE AMIDE (NACA) AND (2R,2R')-3,3' disulfanediyl BIS(2-ACETAMIDOPROPANAMIDE) (DINACA) FOR THE PREVENTION AND TREATMENT OF RADIATION DERMATITIS AND SKIN LIGHTENING, SKIN WHITENING AND SKIN IMPROVEMENT

(71) Applicant: NACUITY PHARMACEUTICALS, INC., Fort Worth, TX (US)

(72) Inventor: G. Michael Wall, Fort Worth, TX (US)

(73) Assignee: NACUITY PHARMACEUTICALS, INC., Fort Worth, TX (US)

( * ) Notice: Subject to any disclaimer, the term of this patent is extended or adjusted under 35 U.S.C. 154(b) by 849 days.

(21) Appl. No.: 17/421,308

(22) PCT Filed: Jan. 9, 2020

(86) PCT No.: PCT/US2020/012975
§ 371 (c)(1),
(2) Date: Jul. 7, 2021

(87) PCT Pub. No.: WO2020/146666
PCT Pub. Date: Jul. 16, 2020

(65) Prior Publication Data
US 2022/0105056 A1    Apr. 7, 2022

Related U.S. Application Data

(60) Provisional application No. 62/791,422, filed on Jan. 11, 2019.

(51) Int. Cl.
*A61K 31/16*     (2006.01)
*A61K 31/198*    (2006.01)
(Continued)

(52) U.S. Cl.
CPC ............ *A61K 31/16* (2013.01); *A61K 31/198* (2013.01); *A61K 45/06* (2013.01); *A61P 17/00* (2018.01); *A61P 39/06* (2018.01)

(58) Field of Classification Search
None
See application file for complete search history.

(56) References Cited

U.S. PATENT DOCUMENTS

| 3,340,147 A | 9/1967 | Martin |
| 5,874,468 A | 2/1999 | Atlas |

(Continued)

FOREIGN PATENT DOCUMENTS

| CA | 3078680 A1 | 5/2019 |
| CA | 3079196 C | 5/2021 |

(Continued)

OTHER PUBLICATIONS

Maddirala, et al. "Prevention and reversal of selenite-induced cataracts by N-acetylcysteine amide in Wistar rats" BMC Ophthalmology (2017) 17:54.

(Continued)

*Primary Examiner* — Jeffrey S Lundgren
*Assistant Examiner* — Anthony Joseph Seitz
(74) *Attorney, Agent, or Firm* — Edwin S. Flores; Daniel J. Chalker; Chalker Flores, LLP (57) ABSTRACT

The present invention includes a method for the use of N-acetylcysteine (NAC), N-acetylcysteine amide (NAC A) or (2R,2R')-3,3'-disulfanediylbis(2-acetamidopropanamide) (diNACA) for the prevention and treatment of radiation dermatitis, radiation damage to the skin, xeroderma pigmentosa or protect patients with xeroderma pigmentosa from skin damage caused by exposure to the sun or other radiation, bioweapons, chemical burns, heat burns, contact damage caused by friction, contact dermatitis, hypersensitivity (Continued)

reactions and skin wrinkles and dehydration, skin lightening, skin whitening, and/or skin improvement in a human that comprises administering to the human a therapeutically effective amount of NAC, NACA or diNACA.

17 Claims, 3 Drawing Sheets

(51) Int. Cl.
    *A61K 45/06*     (2006.01)
    *A61P 17/00*     (2006.01)
    *A61P 39/06*     (2006.01)

(56) References Cited

U.S. PATENT DOCUMENTS

| | | | |
|---|---|---|---|
| 6,420,429 B1 | 7/2002 | Atlas | |
| 8,354,449 B2 | 1/2013 | Goldstein | |
| 8,937,099 B2 | 1/2015 | Goldstein | |
| 8,993,627 B2 | 3/2015 | Goldstein | |
| 9,216,162 B2 | 12/2015 | Goldstein | |
| 9,763,902 B2 | 9/2017 | Warner | |
| 9,889,103 B2 | 2/2018 | Warner | |
| 10,869,846 B2 | 12/2020 | Goldstein | |
| 2003/0027745 A1 | 2/2003 | Repine | |
| 2003/0229141 A1* | 12/2003 | Yu | A61Q 19/08 514/626 |
| 2005/0112572 A1 | 5/2005 | Pincemail et al. | |
| 2009/0234011 A1 | 9/2009 | Goldstein | |
| 2012/0142550 A1 | 6/2012 | Zehnder et al. | |
| 2012/0150029 A1 | 6/2012 | Debuc | |
| 2013/0303436 A1 | 11/2013 | Wilson | |
| 2015/0164830 A1 | 6/2015 | Goldstein | |
| 2017/0020914 A1 | 1/2017 | Castro et al. | |
| 2017/0333375 A1 | 11/2017 | Campochiaro et al. | |
| 2017/0370945 A1 | 12/2017 | Campochiaro et al. | |
| 2019/0135741 A1 | 5/2019 | Wall | |
| 2020/0281944 A1 | 9/2020 | Piraee | |

FOREIGN PATENT DOCUMENTS

| | | | |
|---|---|---|---|
| CN | 108618993 A | 10/2018 | |
| EP | 1975621 A1 | 10/2008 | |
| GB | 1114369 A | 5/1968 | |
| JP | 2005350405 A | 12/2005 | |
| JP | 2008538586 A5 | 10/2008 | |
| JP | 2013533234 A | 8/2013 | |
| JP | 202023549 | 2/2020 | |
| WO | 2003016527 | 2/2003 | |
| WO | 2004012652 A3 | 4/2004 | |
| WO | 2004028536 A1 | 4/2004 | |
| WO | WO-2006116353 A2 * | 11/2006 | A61K 31/16 |
| WO | 2010048716 A1 | 5/2010 | |
| WO | WO-2011044230 A2 * | 4/2011 | A61K 31/185 |
| WO | 2013138744 A1 | 9/2013 | |
| WO | 2014100361 A1 | 6/2014 | |
| WO | 2015148880 A1 | 10/2015 | |
| WO | 2016073829 A2 | 5/2016 | |
| WO | 2017161318 A1 | 9/2017 | |
| WO | 2019060623 A1 | 3/2019 | |
| WO | 2019060634 A1 | 3/2019 | |
| WO | 2019060704 A1 | 3/2019 | |
| WO | 2019094383 A1 | 5/2019 | |
| WO | 2019097434 A1 | 5/2019 | |
| WO | 2020102810 A1 | 5/2020 | |
| WO | 2020146660 A1 | 7/2020 | |
| WO | 2020146666 | 7/2020 | |
| WO | 2020146674 A1 | 7/2020 | |

OTHER PUBLICATIONS

Maeda, et al., "Important Role of the 3-Mercaptopropionamide Moiety in Glutathione: Promoting Effect on Decomposition of the Adduct of Glutathione with the Oxoammonium Ion of TEMPO", J Organic Chem (2005). 70:8338-8343.

Martin, Tellis, "Amides of N-Acylcysteines as Mucolytic Agents", J Med Chem (1967), 10:1172-1176.

McMenamim, et al., Simultaneous analysis of multiple aminothiols in human plasma by high performance liquid chromatography with fluorescence detection, J Chrom B, 877 (2009) 3274-3281.

Miller, WF. "Aerosol therapy in acute and chronic respiratory disease." Arch Intern Med 1973;131:148-155.

Monostori, et al., Determination of glutathione and glutathione disulfide in biological samples: an in-depth review. J Chrom B, 877 (2009) 3331-3346.

Moore, et al., A new LC-MS/MS method for the clinical determination of reduced and oxidized glutathione from whole blood. J Chrom B, 929 (2013) 51-55.

Nakagami, et al. "A novel Nrf2 activator from microbial transformation inhibits radiation-induced dermatitis in mice," Journal of Radiation Research, vol. 57, No. 5, 2016, pp. 567-571.

Zhang, et al., "Effects of N-acetylcysteine and glutathione ethyl ester drops on streptozotocin-induced diabetic cataract in rats." Mol Vis. 2008;14:862-70.

Nash, et al., "Nebulized and oral thiol derivatives for pulmonary disease in cystic fibrosis." Cochrane Database Syst Rev 2009;(1):CD007168.

New, et al., Evaluation of BEH C18, BEH HILIC, and HSS T3 (C18) Column Chemistries for the UPLC-MS-MS Analysis of Glutathione, Glutathione Disulfide, and Ophthalmic Acid in Mouse Liver and Human Plasma. J Chrom Sci, 46 (2008) 209-214.

Niemeyer, Selective Rod-and Cone-ERG Responses on Retinal Degenerations, Digital Journal of Ophthalmology, 1998, vol. 4, No. 10, 1998.

Nozal, et al., Determination of glutathione, cysteine, and N-acetylcysteine in rabbit eye tissues using high-performance liquid chromatography and post-column derivatization with 5,5'-dithiobis(2-nitrobenzoic acid). J Chrom A, 778 (1997) 347-353.

Park, et al.: "Targeted and Reversible Blood-Retinal Barrier Disruption via Focused Ultrasound and Microbubbles" PLoS One (2012), 7(8):e42754.

Poole, et al., "Mucolytic agents versus placebo for chronic bronchitis or chronic obstructive pulmonary disease." Cochrane Database Syst Rev 2015;(7):CD001287).

Reyes, et al., Neuronal glutathione content and antioxidant capacity can be normalized in situ by N-acetyl cysteine concentrations attained in human cerebrospinal fluid, Neurotherapeutics, 13 (2016) 217-225.

Rubin BK. Aerosol Medications for Treatment of Mucus Clearance Disorders Respiratory care 2015; 60(6): 825-832.

Šalamon, et al., "Medical and Dietary Uses of N-Acetylcysteine." Antioxidants 2019, 8, 111.

Schimel, et al., "N-Acetylcysteine Amide (NACA) Prevents Retinal Degeneration by Up-Regulating Reduced Glutathione Production and Reversing Lipid Peroxidation." The American Journal of Pathology, (2011), 178(5):2032-2043.

Sekhon, "Exploiting the Poer of Stereochemistry in Drugs . . . ", Journal of Modern Medicinal Chemistry, 2013, 10-36.

Shen, et al., "Oxidative damage is a potential cause of cone cell death in retinitis pigmentosa." J Cell Physiol, (2005), 203(3):457-64.

Shintani, et al., "Review and Update: Current treatment trends for Patients with Retinitis Pigmentosa," Optometry (2009), 80:384-401.

Squellerio, et al., Direct glutathione quantification in human blood by LC-MS/MS: comparison with HPLC with electrochemical detection. J Pharm Biomed Anal, 71 (2012) 111-8.

Stey, et al., "The effect of oral N-acetylcysteine in chronic bronchitis: a quantitative systematic review." Eur Respir J. 2000; 16(2):253-62.

Suh, et al., Clinical assay of four thiol amino acid redox couples by LC-MS/MS: utility in thalassemia, J Chrom B, 877 (2009) 3418-3427.

Sunitha, et al., N-acetylcysteine amide: a derivative to fulfill the promises of N-acetylcysteine. Free Radic Res, 47 (2013) 357-367.

(56) References Cited

OTHER PUBLICATIONS

Tam, et al., "Nebulized and oral thiol derivatives for pulmonary disease in cystic fibrosis." Cochrane Database Syst Rev 2013;(7):CD007168.
Tarrant et al. "Mucoactive agents for adults with acute lung conditions: A systematic review." Heart & Lung (2019) 48(2):141-147.
Tobwala et al. "N-acetylcysteine Amide (NACA), a Novel GSH Prodrug: Its Metabolism and Implications in Health", abrou, 2013, Capter VI. ISBN:978-1-62417-460-5.
Tse, et al., "High-dose N-acetylcysteinine in stable COPD: the 1-year, double-blind, randomized, placebo-controlled HIACE study." Chest, (2013). 144(1):106-118.
Tuson, et al., "Overexpression of CERKL, a gene responsible for retinitis pigmentosa in humans, protects cells from apoptosis induced by oxidative stress." Mol Vis. (2009), 15:168-80.
United States Patent & Trademark Office (ISA) International Search Report and Written Opinion PCT/US2015/059589 Dated Feb. 2, 2016, 10 pg.
Usui, et al., "Increased expression of catalase and superoxide dismutase 2 reduces cone cell death in retinitis pigmentosa." Mol Ther J Am Soc Gene Ther. (2009), 17(5):778-86.
Usui, et al., "NADPH oxidase plays a central role in cone cell death in retinitis pigmentosa." J Neurochem. (2009), 110(3):1028-37.
Wang, et al., "Relationship of protein-glutathione mixed disulfide and thioltransferase in H2O2-induced cataract in cultured pig lens." Exp Eye Res. May 1997;64(5):693-700.
Wang, et al., "Hyperoxia-induced lens damage in rabbit: protective effects of N-acetylcysteine." Mol Vis. 2009;15:2945-52.
Weng, Bioanalytical liquid chromatography tandem mass spectrometry methods on underivatized silica columns with aqueous/organic mobile phases. J Chrom B, 796 (2003) 209-224.
Wu, et al., "Effects of N-acetylcysteine amide (NACA, a thiol antioxidant on radiation-induced cytotoxicity in Chenese hamster ovary cells," Life Sciences (2008), 82:1122-1130.
Wu, et al., Separation and quantification of N-acetyl-L-cysteine and N-acetyl cysteine-amide by HPLC with fluorescence detection. Biomed Chromatogr, 20 (2006) 415-422.
Yu, et al., "Intraretinal oxygen levels before and after photoreceptor loss in the RCS rat." Invest Ophthalmol Vis Sci, (2000), 41(12):3999-4006.
Ehre, et al. An Improved Inhaled Mucolytic to Treat Airway Muco-obstructive Diseases. Am J Respir Crit Care Med. Jan. 15, 2019;199(2):171-180. doi: 10.1164/rccm.201802-02450C.
European Patent Office, Extended European Search Report for EP 15857309.7 dated May 23, 2018.
Han, et al., "Efficacy of nebulized acetylcysteine for relieving symptoms and reducing usage of expectorants in patients with radiation pneumonitis." Thoracic Cancer 2018; 1-6. doi: 10.1111/1759-7714.12938.
Kelly, "Clinical applications of N-acetylcysteine." Altern Med Rev J Clin Ther. (1998), 3(2):114-27.
Amer, et al., "N-acetylcysteine amide (AD4) attenuates oxidative stress in beta-thalassemia blood cells." Biochimica et Biophysica Acta 1780 (2008) 249-255.
Ates, et al., "Antioxidant and free radical scavenging properties of N-acetylcysteine amide (NACA) and comparison with N-acetylcysteine (NAC)." Free Radic Res. (2008), 42(4):372-7.
Australian Patent Office (ISA), International Search Report and Written Opinion PCT/US2018/059446 dated Dec. 31, 2018, 15 pg.
Australian Patent Office (ISA), International Search Report and Written Opinion PCT/US2018/061357 dated Dec. 18, 2018, 11 pg.
Australian Patent Office (ISA), International Search Report and Written Opinion PCT/US2020/012968 dated Mar. 13, 2020, 10 pp.
Australian Patent Office (ISA), International Search Report and Written Opinion PCT/US2020/012975 dated Mar. 13, 2020, 12 pp.
Australian Patent Office (ISA), International Search Report and Written Opinion PCT/US2020/012983 dated Mar. 13, 2020, 15 pp.
Australian Patent Office, International Search Report and Written Opinion PCT/US2021/014819 dated Mar. 25, 2021, 18 pp.

Babizhayev, et al., Revival of the Lens Transparency with N-Acetylcarnosine.: Current Drug Therapy, 2006:1; 91-116.
Bahat-Stroomza, et al., A novel thiol antioxidant that crosses the blood brain barrier protects dopaminergic neurons in experimental models of Parkinson's disease. European Journal of Neuroscience, 2005; 21: 637-646.
Banerjee, et al., "HIV proteins (gp120 and Tat) and methamphetamine in oxidative stress-induced damage in the brain: Potential role of the thiol antioxidant N-acetylcysteine amide." Free Radic Biol Med. May 15, 2010; 48(10): 1388-1398.
Betterridge, What is Oxidative Stress Metabolism, vol. 49, No. 2, Feb. 2000, pp. 3-8.
Boone "The K-Zone: Biophysical Data Tables", 1994-2006, downloaded from www.kevinboone.com on Mar. 14, 2009.
Buss, et al., "Protein carbonyl measurement by a sensitive ELISA method." Free Radic Biol Med, (1997), 23(3):361-6.
Campochiaro, et al., "Oral N-acetylcysteine improves cone function in retinitis pigmentosa patients in phase I trial." J Clin Invest. 2020 130(3):1527-1541.
Carey, et al., "In vivo inhibition of I-buthionine-(S, R)-sulfoximine-induced cataracts by a novel antioxidant, N-acetylcysteine amide." Free Radical Biol Med. 2011;15.
Carey, et al. "N-acetyl-L-cysteine amide protects retinal pigment epithelium against methamphetamine-induced oxidative stress" Journal of Biophysical Chemistry, vol. 3, No. 2, 101-110 (2012).
Carroll, et al., "Simultaneous quantitation of oxidized and reduced glutathione via LC-MS/MS: An insight into the redox state of hematopoietic stem cells." Free Radical Biology and Medicine, 97 (2016) 85-94.
Chastain, et al. "Distribution of topical ocular nepafenac and its active metabolite amfenac to the posterior segment of the eye." Exp Eye Res (2016), 145:58-67.
Davies, et al., "Measurements of protein carbonyls, ortho- and meta-tyrosine and oxidative phosphorylation complex activity in mitochondria from young and old rats." Free Radic Biol Med, (2001), 31(2):181-90.
Devries, et al. "N-acetyl-l-cysteine." J Cell Biochem Suppl (1993), 17F:270-277.
Dietzsch, et al., "Cystic fibrosis: comparison of two mucolytic drugs for inhalation treatment (acetylcysteine and arginine hydrochloride)." Pediatrics 1975;55:96-100.
Dong, et al., "Compared with N-acetylcysteine (NAC), N-Acetylcysteinne Amid (NACA) Provides Increased Protein of Cone Function in a Model of Retinitis Pigmentosa." Investigative Ophthalmology Visual Science, (2014), 55:1-2. (Abstract).
Ercal, et al., "Effects of a thiol antioxidant in various cataract models," Acta Ophthalmologica (2016), 94:S256 (Abstract).
Ercal, et al., High-performance liquid chromatography assay for N-acetylcysteine in biological samples following derivatization with N-(1-pyrenyl)maleimide. J Chrom B, 685 (1996) 329-334.
European Patent Office, Extended European Search Report for EP 18876329.6 dated Oct. 29, 2019.
European Patent Office, Extended European Search Report for EP 18882212.6 dated Jul. 6, 2021, 8 pp.
Giustarini, et al., Pitfalls in the analysis of the physiological antioxidant glutathione (GSH) and its disulfide (GSSG) in biological samples: an elephant in the room. J Chrom B., 1019 (2016) 21-28.
Heymann, et al., "The preparation and Some Biological Properties of the Asperagine Analog L-2@-Amino-2-carboxyethanesulfonamide," J Am Chem Soc (1959), 81(19):5125-5128.
Isokawa, et al., Analytical methods involving separation techniques for determination of low-molecular-weight biothiols in human plasma and blood. J Chrom B, 964 (2014) 103-115.
Jastrzębska, et al., "N-acetylcysteine amide (AD4) reduces cocaine-induced reinstatement." Psychopharmacology 2016;33:3437-3448.
Kahns, et al., "Prodrugs as drug delivery systems. 107. Synthesis and chemical and enzymatic hydrolysis kinetics of various mono- and diester prodrug of N-acetylcysteine." Int J Pharm (1990), 62:193-205.
Katz, et al., Cerebrospinal fluid concentrations of N-acetylcysteine after oral administration in Parkinsons disease. Parkinsonism and Related Disorders, 21 (2015) 500-503.

(56) References Cited

OTHER PUBLICATIONS

Kim, et al., "N-Acetylcysteine increases corneal cell survival in a mouse model of Fuchs endothelial corneal dystrophy," Experimental Eye Research (2014), 127:20-25.
Komeima, et al., "Antioxidants reduce cone cell death in a model of retinitis pigmentosa." PNAS, (2006), 103(30):11300-11305.
Komeina, et al., "Antioxidants slow photoreceptor cell death in mouse models of retinitis pigmentosa." J Cell Physiol. (2007), 213(3):809-15.
Komeina, et al., "Blockade of neuronal nitric oxide synthase reduces cone cell death in a model of retinitis pigmentosa." Free Radic Biol Med, (2008), 45(6):905-12.
Kusmierek, et al., Ultraviolet derivatization of low-molecular-mass thiols for high performance liquid chromatography and capillary electrophoresis analysis, J Chrom B, 879 (2011) 1290-1307.
Grinberg, et al., "N-acetylcysteine amide, a novel cell-permeating thiol, restores cellular glutathione and protects human red blood cells from oxidative stress," Free Radical Biol Med. (2005);38(1):136-145.
Lee, et al., "N-Acetylcysteine Promotes Long-Term Survival of Cones in a Model of Retinitis Pigmentosa," J Cell Physiol (2011), 226:1843-1849.
Liu, et al., "A rabbit model to study biochemical damage to the lens after vitrectomy: effects of N-acetylcysteine." Exp Eye Res. 2009;88(6):1165-70.
Adil, et al. "N-acetylcysteine in dermatology" Indian Journal of Dermatology, Feb. 2018.
European Patent Office, Extended European Search Report for EP 20738196.3 dated Oct. 11, 2022, 13 pp.
Hsu, et al. "Feasibility of corneal drug delivery of cysteamine using vitamin E modified silicone hydrogel contact lenses" European Journal of Pharnlaceutics and Biopharnlaceutics 85 (2013) 531-540.
Japan Patent Office, Notification of Reasons for Refusal dated Dec. 18, 2023 for Japanese Appl. No 2021-540019 (with english translation), 8 pp.
Shams, et al. "Treatment of corneal cystine crystal accumulation in patients with cystinosis" Clinical Opthamalogy, Oct. 10, 2014, 2077-2078.
Vaisbich, et al. "Oxidative Stress in Cystinosis Patients" Nephron Extra, 2011; 1:73-77, publishes online Sep. 19, 2011.
Australian Patent Office (ISA), International Search Report and Written Opinion for PCT/US2015/060172 Dated Apr. 13, 2016, 12 pg.
Australian Patent Office (ISA), International Search Report and Written Opinion for PCT/US2018/052065 dated Jan. 10, 2019, 10 pg.
Australian Patent Office, International Search Report and Written Opinion PCT/US2021/036210 dated Jul. 19, 2021, 12 pp.
Australian Patent Office, Examination Report for Australian Appl. No. 2020227015 dated Sep. 24, 2021, 6 pp.
Bean, et al., "Comparative evaluation of antioxidant reactivity within obstructed and control rabbit urinary bladder tissue using FRAP and CUPRAC assays," Molecular and Cellular Biochemistry (2008) 323(1-2):139-142.
Bernardes, et al., "From Disulfide- to Thioether-Linked Glycoproteins" Angewandte Chemie, Supporting Information (2008), S1-S97.
Canadian Patent Office, Examination Report for Canadian Patent Appl. No. 3,046,363 dated Jun. 6, 2022, 4 pp.
Campochiaro, et al. "Is there Excess Oxidative Stress and Damage in Eyes of Patients with Retinitis Pigmentosa" Antioxidants Redox Signaling, (2015) 23(7):643-648.
Campochiaro, et al. "The Mechanism of Cone Cell Death in Retinitis Pigmentosa", Progress in Retinal and Eye Research (2018), 62:24-37.
Demirel, et al. "The preventive effect of N-acetylcysteine on radiation-induced dermatitis in a rat model" Journal of BUON, 15:577-582, 2010.
Dietz, et al., "Photochemical Reduction of 5-Bromouracil by Cysteine Derivatives and Coupling of 5-Bromouracil to Cystine Derivatives," Photochemistry and Photobiology (1989), 49(2):121-129.
European Patent Office, Extended European Search Report for 15770142.6 dated Oct. 20, 2017.
European Patent Office, Extended European Search Report for 15858590.1 dated May 2, 2018.
European Patent Office, Extended European Search Report for EP 20738980.0 dated Jan. 28, 2022, 9 pp.
Hong, et al. "Effect of High-Dose Intravenous N-acetylcysteine on the Concentration of Plasma Sulfur-Containing Amino Acids", The Korean Journal of Internal Medicine: 20:217-223, 2005.
Intellectual Property India, First Examination Report for Indian Appl. No. 201917036550 dated Sep. 22, 2021, 7 pp.
Jones, "Extracellular Redox State: Refining the Definition of Oxidative Stress in Aging," Rejuvenation Research (2006), 9(2):169-181.
Kunisada, et al. "CXCL1 Inhibition Regulates UVB-Induced Skin Inflammation and Tumorigenesis in Xpa-Deficient Mice" Journal of Investigative Dermatology (2017), 137, 1975-1983.
Levine, R.L., "Carbonyl modified proteins in cellular regulation, aging, and disease" Free Radic Biol Med, 2002. 32(9): p. 790-6.
Li, et al., "A Convenient Synthesis of Amino Acid Methyl Esters", Molecules (2008), 13:1111-1119.
Lu, et al., "Effects of Different Types of Oxidative Stress in RPE Cells," J Cell Phys (2006), 206(1):119-125.
Martinez-Fernandez De La Camara, et al., Altered Antioxidant-Oxidant Status in Aqueous Humor and Peripheral Blood of Patents with Retinitis Pigmentosa, PLOS One (2013), 8(9):E74223.
Minozzi, et al., "An Insight into the Radical Thiol/Yne Coupling: The Emergence of Arylalkyne-tagged Suggars for te Direct Photoinduced Glycosylation of Cysteine Containing Peptides", J. Org. Chem, 2011, 76, 450-459.
Offen, et al. "A low molecular weight copper chelator crosses the blood-brain barrier and attenuates experimental autoimmune encephalomyelitis" Journal of Neurochemistry, 2004, 89, 1241-1251.
Reagan-Shaw, et al. "Dose translation from animal to human studies revised" The FASEB Journal, Mar. 2007, vol. 22, (659-661).
Riley, et al., "Glutathione in the aqueous humor of human and other species." Investigative ophthalmology visual science, (1980), 9(1):94-96.
Shen, et al., "Oxidative damage in age-related macular degeneration," Histology and Histopathology (2007), 22(12):1301-1308.
Sunitha, et al. "N-Acetylcysteine amide: a derivative to fulfill the promises of N-Aceylcysteine" Free Radical Resarch, May 2013, 47(5), 357-367.
Supelco "Methanolic H2S04 (10./o v/v)" 1997, Sigma-Aldrich Co., 2 Pages.
Tsai, et al. "Topical TV-Acetylcysteine Accelerates Wound Healing in Vitro and in Vivo via the PKC/Stat3 Pathway" Int. J. Mol. Sci., 2014, 15, 7563-7578.
University of Sao Paulo, et al. "N-Acetyl Cysteine for Cystinosis Patients", ClinicalTrials.gov [online], identifier: NCT01614431, Last update posted: Jun. 20, 2012, htps://clinicaltrials.gov/ct2/show/NCT01614431, [retrieved online Jul. 9, 2021].
Usui, et al., "Overexpression of SOD in retina: Need for increase in H202-detoxifying enzyme in same cellular compartment," Free Radical Biology and Medicine (2011 ), 51(7):1347-1354.

\* cited by examiner

N-ACETYLCYSTEINE AMIDE (NACA) AND (2R,2R')-3,3' disulfanediyl BIS(2-ACETAMIDOPROPANAMIDE) (DINACA) FOR THE PREVENTION AND TREATMENT OF RADIATION DERMATITIS AND SKIN LIGHTENING, SKIN WHITENING AND SKIN IMPROVEMENT

CROSS-REFERENCE TO RELATED APPLICATIONS

This application is the National Stage of International Application No. PCT/US2020/012975, filed on Jan. 9, 2020, which claims priority to U.S. Provisional Patent Application Ser. No. 62/791,422, filed on Jan. 11, 2019. The contents of both applications are incorporated by reference herein in their entirety.

STATEMENT OF FEDERALLY FUNDED RESEARCH

None.

TECHNICAL FIELD OF THE INVENTION

The present invention relates in general to the use of N-acetylcysteine amide (NACA) or (2R,2R')-3,3'-disulfanediyl bis(2-acetamidopropanamide) (diNACA) for the prevention and treatment of radiation dermatitis, radiation damage to the skin, skin lightening, whitening or to improve skin health.

BACKGROUND OF THE INVENTION

Radiation dermatitis is one of the most common adverse events in radiotherapy for cancer, and 95% of patients receiving radiotherapy show this symptom. The dermatitis not only decreases quality of life, but also hampers the conducting of necessary additional radiotherapy. Moreover, there is no effective drug therapy, except for topical steroids and emollient creams. Radiation is thought to damage the skin in two ways: by generating reactive oxygen species after reacting with water in the cytosol, and by consequent indirect inflammation. Considering the above facts, the mechanisms of action of Nrf2 activators seem appropriate for combating the progress of radiation dermatitis. [Nakagami et al. Journal of Radiation Research, Vol. 57, No. 5, 2016, pp. 567-571].

Skin aging is a complex biological phenomenon that includes two independent clinically and biologically distinct processes, namely "intrinsic aging" and "extrinsic aging. Extrinsic aging (including "photoaging") is the result of exposure to outdoor elements, primarily ultraviolet (UV) irradiation. Photoaged skin shows a variety of age-associated clinical alterations, including deep wrinkles, sallow discoloration, and irregular pigmentation. Recently, it has been revealed that reactive oxygen species (ROS) produced excessively in the cells are involved in the process of skin aging caused by UV exposure. ROS have a paradoxical action on melanocytes: in the skin they not only enhance depigmentation but also increase pigmentation. UVB-induced $H_2O_2$ in keratinocytes causes melanocyte degeneration in the skin of patients with vitiligo. In contrast, NO induces melanogenesis by increasing the amounts of tyrosinase and tyrosinase-related protein. Melanogenesis associated with ROS is suppressed by antioxidant treatment. NO production via the stabilization of NO synthase contributes partly to the suppression of melanogenesis by ascorbic acid. N-acetyl cysteine (a precursor of glutathione) inhibits alpha-melanocyte-stimulating hormone induction by UVB irradiation. (Watanabe F; Hashizume E; Chan G P; Kamimura A. Skin-whitening and skin-condition-improving effects of topical oxidized glutathione: a double-blind and placebo-controlled clinical trial. Clin Cosmetic Inv Dermatol. 2014; 7:267-274.).

Glutathione, a tripeptide of cysteine, glycine, and glutamate, is a primary antioxidant in the body and plays important roles in maintaining intracellular thiol status and in detoxification. Although glutathione exists in both reduced (GSH) and oxidized (GSSG) states, the majority of its pool in the body is in the reduced form. GSH exerts antioxidant activity by acting as a free-radical scavenger during the reductive detoxification of hydrogen peroxide and lipid peroxide. In mammalian cells, GSH serves as an electron donor. During electron donation it is converted to GSSG by glutathione peroxidase, but it is reduced back to GSH by glutathione reductase in the presence of nicotinamide adenine dinucleotide phosphate. GSH has a variety of physiological effects. Importantly, it inhibits melanogenesis by suppressing the activity of tyrosinase, and oral administration of GSH in humans reduces melanin production in the skin. GSH in aqueous solution is highly unstable and easily decomposed. For this reason, there have been no reported investigations of the skin-whitening effect of GSH in topical formulations, unlike in oral formulations. In contrast, GSSG is less susceptible to decomposition in aqueous solution and is suitable for use in liquid form, although the skin-whitening effect of topical GSSG is unknown. In a study of 30 healthy adult women, aged 30 to 50 years, healthy female subjects, Watanabe et al. (2014) demonstrated topical GSSG safely and effectively whitens the skin and improves skin condition.

SUMMARY OF THE INVENTION

In accordance with an embodiment, the present invention provides a method for the use of N-acetylcysteine (NAC), N-acetylcysteine amide (NACA) or (2R,2R')-3,3'-disulfanediyl bis(2-acetamidopropanamide) (diNACA) for the prevention and/or treatment of at least one of: radiation dermatitis, radiation damage to the skin, skin lightening, whitening or to improve skin health in an animal or human that comprises administering to the animal or human a therapeutically effective amount of N-acetylcysteine amide NAC, NACA, or diNACA. In one aspect, the NAC, NACA or diNACA is provided in or with a pharmaceutically acceptable carrier. In another aspect, the NACA is administered intraocularly, subretinally, intravitreally, orally, intravenously, intramuscularly, topically, sublingually, by injection into the skin, or rectally. In another aspect, the NAC, NACA or diNACA is administered in daily doses of about 0.5 to 150 mg/Kg. In another aspect, NAC, NACA or diNACA is administered two or three times daily. In another aspect, NAC, NACA or diNACA is administered with a second active agent selected from at least one of ascorbic acid, cysteine hydrochloride, sodium bisulfate, sodium metabisulfite, sodium sulfite, ascorbyl palmitate, butylated hydroxyanisole (BHA), butylated hydroxytouene (BHT), lecithin, propyl gallate, α-tocopherol, citric acid, ethylenediamine tetraacetic acid (EDTA), sorbitol, tartaric acid, or phosphoric acid. In another aspect, the dose for administration is 100, 150, 150, 300, 333, 400, 500, 600, 700, 750, 800, 900, 1,000, 2,500, 5,000, 7,500, or 10,000 mg per dose. In another aspect, the does for administration is 0.1-0.25, 0.1-0.4, 0.35-0.5, 0.5-1, 1-2, 1-3, 1-4, 1-5, 1-2.5, 2.5-3.5, 4-6, 5-8, 6-9, 7-10 grams per dose. In another aspect, the NACA is delivered orally via a mini-tablet, capsule, tablet, effervescent, dual release, mixed release, sachet, powder, or liquid. In another aspect, the NACA is administered prophylactically to prevent and/or treat radiation dermatitis, skin lightening, whitening or to improve skin health. In another aspect, the animal is a human. In one aspect, the method further comprises adding NACA or diNACA into a formulation to prevent radiation damage to the skin from sun exposure. In one aspect, the method further comprises adding NACA or diNACA into a formulation to prevent exposure to bioweapons, chemical burns, heat burns, contact damage caused by friction. In one aspect, the method further comprises adding NACA or diNACA into a formulation to treat xeroderma pigmentosa. In one aspect, the method further comprises adding NACA or diNACA into a formulation to treat other skin disorders caused by oxidative stress.

In accordance with another embodiment, the present invention includes a method for the prevention and/or treatment of radiation dermatitis, skin lightening, whitening or to improve skin health comprising: identifying a human in need of prevention and/or treatment of radiation dermatitis, skin lightening, whitening or to improve skin health; and administering to the human a therapeutically effective amount of NAC, NACA or diNACA sufficient to prevent and/or treat the radiation dermatitis, skin lightening, whitening or to improve skin health. In one aspect, the NAC, NACA or diNACA is provided in or with a pharmaceutically acceptable carrier. In another aspect, the NAC, NACA or diNACA is administered intraocularly, subretinally, intravitreally, orally, intravenously, intramuscularly, topically, sublingually, cutaneously, subcutaneously, by injection into the skin, or rectally. In another aspect, the NAC, NACA or diNACA is administered in daily doses of about 0.5 to 150 mg/Kg. In another aspect, NAC, NACA or diNACA is administered two or three times daily. In another aspect, NAC, NACA or diNACA is administered with a second active agent selected from at least one of ascorbic acid, cysteine hydrochloride, sodium bisulfate, sodium metabisulfite, sodium sulfite, ascorbyl palmitate, butylated hydroxyanisole (BHA), butylated hydroxytouene (BHT), lecithin, propyl gallate, α-tocopherol, citric acid, ethylenediamine tetraacetic acid (EDTA), sorbitol, tartaric acid, or phosphoric acid. In another aspect, the dose for administration is 100, 150, 150, 300, 333, 400, 500, 600, 700, 750, 800, 900, 1,000, 2,500, 5,000, 7,500, or 10,000 mg per dose. In another aspect, the does for administration is 0.1-0.25, 0.1-0.4, 0.35-0.5, 0.5-1, 1-2, 1-3, 1-4, 1-5, 1-2.5, 2.5-3.5, 4-6, 5-8, 6-9, 7-10 grams per dose. In another aspect, the NAC, NACA or diNACA is delivered orally via a mini-tablet, capsule, tablet, effervescent, dual release, mixed release, sachet, powder, or liquid. In another aspect, the NAC, NACA or diNACA is administered prophylactically to prevent and/or treat radiation dermatitis, skin lightening, whitening or to improve skin health. In one aspect, the method further comprises adding NACA or diNACA into a formulation to prevent radiation damage to the skin from sun exposure. In one aspect, the method further comprises adding NACA or diNACA into a formulation to prevent exposure to bioweapons, chemical burns, heat burns, contact damage caused by friction. In one aspect, the method further comprises adding NACA or diNACA into a formulation to treat xeroderma pigmentosa. In one aspect, the method further comprises adding NACA or diNACA into a formulation to treat other skin disorders caused by oxidative stress.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

N-acetylcysteine, also known as 2-acetamido-3-sulfanyl-propanoic acid or NAC, has the structure:

N-acetyl-L-cysteine amide (NACA), also known as (R)-2-(acetylamino)-3-mercapto-propanamide, N-acetyl-L-cysteinamide, or acetylcysteinamide, the amide form of N-acetyl-L-cysteine (NAC), acts as a carrier of NAC has the structure:

(2R,210-3,3'-disulfanediyl bis(2-acetamidopropanamide) (diNACA), is the dimer form of N-acetyl-L-cysteine amide, acts as a carrier of NAC or cysteine. has the structure:

Di-NACA
C₁₀H₁₈N₄O₄S₂
Mol Wt: 322.40

Gluthathione (GSH) is a tripeptide, c-L-glutamyl-L-cysteinyl-glycine, found in all mammalian tissues. It has several important functions including detoxification of electrophiles, scavenging ROS<maintaining the thiol status of proteins, and regeneration of the reduced forms of vitamins C and E. GSH is the dominant non-protein thiol in mammalian cells; as such it is essential in maintaining the intracellular redox balance and the essential thiol status of proteins. Also, it is necessary for the function of some antioxidant enzymes such as the glutathione peroxidases.

Intracellular GSH levels are determined by the balance between production and loss. Production results from de novo synthesis and regeneration of GSH from GSSG by GSSG reductase. Generally there is sufficient capacity in the GSSG reductase system to maintain all intracellular GSH in the reduced state, so little can be gained by ramping up that pathway. The major source of loss of intracellular GSH is transport out of cells. Intracellular GSH levels range from 1-8 mM while extracellular levels are only a few µM; this large concentration gradient essentially precludes transport of GSH into cells and once it is transported out of cells, it is rapidly degraded by γ-glutamyltranspeptidase. Inhibition of GSH transporters could theoretically increase intracellular GSH levels, but is potentially problematic because the transporters are not specific for GSH and their suppression could lead imbalance of other amino acids and peptides. Thus, intracellular GSH levels are modulated primarily by changes in synthesis.

GSH is synthesized in the cytosol of virtually all cells by two ATP-requiring enzymatic steps: L-glutamate+L-cysteine+ATP [→]γ-glutamyl-L-cysteine+ADP+Pi and γ-glutamyl-L-cysteine+L-glycine+ATP [→] GSH+ADP+Pi. The first reaction is rate-limiting and is catalyzed by glutamate cysteine ligase (GCL, EC 6.3.2.2). GCL is composed of a 73 Kd heavy catalytic subunit (GCLC) and a 30 Kd modifier subunit (GCLM), which are encoded by different genes. GCCL is regulated by nonallosteric competitive inhibition of GSH (Ki=2.3 mM) and by the availability of L-cysteine. The apparent $K_m$ of GLC for glutamate is 1.8 mM and intracellular glutamate concentration is roughly 10-fold higher so that glutamate is not limiting, but the Km for cysteine is 0.1-0.3 mM, which approximates its intracellular concentration. The second reaction is catalyzed by GSH synthase (GS, EC 6.3.2.3), which is 118 Kd and composed of two identical subunits. While GS is not felt to be important in regulation of GSH synthesis under normal conditions, it may play a role under stressful conditions because in response to surgical trauma, GSH levels and GS activity were reduced while GCL activity was unchanged. Furthermore, compared to increased expression of GCLC alone, increased expression of both GCLC and GS resulted in higher levels of GSH. In order to maximize the effects of increasing synthetic enzymes, it is necessary to provide increased levels of cysteine. In cultured neurons, 90% of cysteine uptake occurs through by the sodium-dependent excitatory amino acid transporter (EAAT) system. There are five EAATs and cysteine uptake by neurons occurs predominantly by EAAT3 more commonly known as excitatory amino acid carrier-1 (EAAC1). Under normal circumstances most EAAC1 is in the ER and only translocates to the plasma membrane when activated. This translocation is negatively regulated by glutamate transporter associated protein 3-18 (GTRAP3-18) and suppression of GTRAP3-18) increased GSH levels in neurons. Thus, internalization of cysteine provides a road block for GSH synthesis, but fortunately it can be bypassed by N-acetylcysteine (NAC) which readily enters cells even in the absence of activated EAAC1. Systemically administered NAC gains access to the CNS, increases GSH levels, and provides benefit in neurodegenerative disorders in which oxidative stress is an important part of the pathogenesis.

All cellular compartments must be protected against oxidative damage, including the cytoplasm, mitochondria and the nucleus. The present inventors have previously performed gene transfer of enzymes that detoxify reactive oxygen species, but that approach requires expression of two enzymes in the cytoplasm and two enzymes in mitochondria. In contrast, the present invention provides for protection of all cellular compartments with expression of only two enzymes in the cytosol because GSH is able to diffuse everywhere throughout cells.

NAC is used for the treatment of acetaminophen overdose at a dose of 140 mg/kg as the loading dose, followed by 70 mg/kg every 4 hours for 17 doses, starting 4 hours after the loading dose. In clinical studies, NAC has been administered orally from 400 to 1000 mg once daily and from 200 to 600 mg three times daily. However, following an oral dose of 600 mg in humans, NAC is rapidly absorbed and then rapidly cleared. The plasma half-life of NAC has been reported to be 2.5 hours and no NAC is detectable 10-12 hours after administration. During absorption, NAC is rapidly metabolized to cysteine, which is a direct precursor of glutathione. In accordance with an embodiment, the present invention provides a method for the prevention, amelioration, or treatment of a disease or condition associated with oxidative stress in a subject comprising administration of a therapeutically effective amount of NACA, to increase the amount of glutathione expressed in the tissues of the subject.

As used herein, "active oxygen species" or "reactive oxygen species" are understood as transfer of one or two electrons produces superoxide, an anion with the form $O_2"$, or peroxide anions, having the formula $O_2\_"$ or compounds containing an 0-0 single bond, for example hydrogen peroxides and lipid peroxides. Such superoxides and peroxides are highly reactive and can cause damage to cellular components including proteins, nucleic acids, and lipids.

As used herein, the term "agent" refers to a therapeutically active compounds or a potentially therapeutic active compound, e.g., an antioxidant. An agent can be a previously known or unknown compound. As used herein, an agent is typically a non-cell based compound, however, an agent can include a biological therapeutic agent, e.g., peptide or nucleic acid therapeutic, e.g., siRNA, shRNA, cytokine, antibody, etc.

As used herein, the terms "amelioration" or "treatment" is understood as meaning to lessen or decrease at least one sign, symptom, indication, or effect of a specific disease or condition. For example, prevention, amelioration or treatment of radiation dermatitis, skin lightening, whitening or to improve skin health can be to reduce, delay, or eliminate one or more signs or symptoms of radiation dermatitis, skin lightening, whitening or to improve skin health including, but not limited to, improved skin health, a reduction in radiation induced dermatitis, skin lightening, and/or whitening; or any other clinically acceptable indicators of disease state or progression. Amelioration and treatment can require the administration of more than one dose of an agent, either alone or in conduction with other therapeutic agents and interventions. Amelioration or treatment does not require that the disease or condition be cured.

As used herein, the term "Antioxidant" refers to a molecule for slowing or preventing the oxidation of other molecules. Oxidation is a chemical reaction that transfers electrons from a substance to an oxidizing agent. Such reactions can be promoted by or produce superoxide anions or peroxides. Oxidation reactions can produce free radicals, which start chain reaction that damage cells. Antioxidants terminate these chain reactions by removing free radical intermediates, and inhibit other oxidation reactions by being oxidized themselves. As a result, antioxidants are often reducing agents such as thiols, ascorbic acid or polyphenols. Antioxidants include, but are not limited to, α-tocopherol, ascorbic acid, Mn(III)tetrakis (4-benzoic acid) porphyrin, α-lipoic acid, and n-acetylcysteine.

As used herein, the terms "effective amount" or "effective doses" refer to that amount of an agent to product the intended pharmacological, therapeutic or preventive results. The pharmacologically effective amount results in the amelioration of one or more signs or symptoms of a disease or condition or the advancement of a disease or conditions, or causes the regression of the disease or condition. For example, a therapeutically effective amount preferably refers to the amount of a therapeutic agent that decreases vision loss, the loss of overall visual acuity, the loss of visual field, by at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or more as compared to an untreated control subject over a defined period of time, e.g., 2 weeks, one month, 2 months, 3 months, 6 months, one year, 2 years, 5 years, or longer. More than one dose may be required to provide an effective dose.

As used herein, the terms "effective" and "effectiveness" includes both pharmacological effectiveness and physiological safety. Pharmacological effectiveness refers to the ability of the treatment to result in a desired biological effect in the patient. Physiological safety refers to the level of toxicity, or other adverse physiological effects at the cellular, organ and/or organism level (often referred to as side-effects) resulting from administration of the treatment. On the other hand, the term "ineffective" indicates that a treatment does not provide sufficient pharmacological effect to be therapeutically useful, even in the absence of deleterious effects, at least in the unstratified population. (Such as treatment may be ineffective in a subgroup that can be identified by the expression profile or profiles.) "Less effective" means that the treatment results in a therapeutically significant lower level of pharmacological effectiveness and/or a therapeutically greater level of adverse physiological effects, e.g., greater liver toxicity.

Thus, in connection with the administration of a drug, a drug which is "effective against" a disease or condition indicates that administration in a clinically appropriate manner results in a beneficial effect for at least a statistically significant fraction of patients, such as an improvement of symptoms, a cure, a reduction in disease signs or symptoms, extension of life, improvement in quality of life, or other effect generally recognized as positive by medical doctors familiar with treating the particular type of disease or condition.

As used herein, the terms "peroxidases" or "a peroxide metabolizing enzyme" refer to a large family of enzymes that typically catalyze a reaction of the form:

$ROOR_1 + \text{electron donor (2 e-)} + 2H+ \rightarrow ROH + R_1OH$ For many of these enzymes the optimal substrate is hydrogen peroxide, wherein each R is H, but others are more active with organic hydroperoxides such as lipid peroxides. Peroxidases can contain a heme cofactor in their active sites, or redox active cysteine or selenocysteine residues.

As used herein, the term phrase "pharmaceutically acceptable carrier" is art recognized and includes a pharmaceutically acceptable material, composition or vehicle, suitable for administering compounds of the present invention to mammals. The carriers include liquid or solid filler, diluent, excipient, solvent or encapsulating material, involved in carrying or transporting the subject agent from one organ, or portion of the body, to another organ, or portion of the body. Each carrier must be "acceptable" in the sense of being compatible with the other ingredients of the formulation and not injurious to the patient. For example, pharmaceutically acceptable carriers for administration of cells typically is a carrier acceptable for delivery by injection, and do not include agents such as detergents or other compounds that could damage the cells to be delivered. Some examples of materials which can serve as pharmaceutically acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; phosphate buffer solutions; and other non-toxic compatible substances employed in pharmaceutical formulations, particularly phosphate buffered saline solutions which are preferred for intraocular delivery.

Wetting agents, emulsifiers and lubricants, such as sodium lauryl sulfate and magnesium stearate, as well as coloring agents, release agents, coating agents, sweetening, flavoring and perfuming agents, preservatives and antioxidants can also be present in the compositions.

Examples of pharmaceutically acceptable antioxidants include: water soluble antioxidants, such as ascorbic acid, cysteine hydrochloride, sodium bisulfate, sodium metabisulfite, sodium sulfite and the like; oil-soluble antioxidants, such as ascorbyl palmitate, butylated hydroxyanisole (BHA), butylated hydroxytoluene (BHT), lecithin, propyl gallate, α-tocopherol, and the like; and metal chelating agents, such as citric acid, ethylenediamine tetraacetic acid (EDTA), sorbitol, tartaric acid, phosphoric acid, and the like.

Formulations of the present invention include those suitable for oral, nasal, topical, transdermal, buccal, sublingual, intramuscular, intraperotineal, intraocular, intravitreal, subretinal, and/or other routes of parenteral administration. The specific route of administration will depend, inter alia, on the specific cell to be targeted. The formulations may conveniently be presented in unit dosage form and may be prepared by any methods well known in the art of pharmacy. The amount of active ingredient that can be combined with a carrier material to produce a single dosage form will generally be that amount of the compound that produces a therapeutic effect.

As used herein, "plurality" is understood to mean more than one. For example, a plurality refers to at least two, three, four, five, or more.

As used herein, the term a "polypeptide" or "peptide" is understood as two or more independently selected natural or non-natural amino acids joined by a covalent bond (e.g., a peptide bond). A peptide can include 2, 3, 4, 5, 6, 7, 8, 9, 10, 11, 12, 13, 14, 15, 16, 17, 18, 19, 20, or more natural or non-natural amino acids joined by peptide bonds. Polypeptides as described herein include full-length proteins (e.g., fully processed proteins) as well as shorter amino acids sequences (e.g., fragments of naturally occurring proteins or synthetic polypeptide fragments).

As used herein, the term "small molecule" refers to a compound, typically an organic compound, having a molecular weight of no more than about 1500 Da, 1000 Da, 750 Da, or 500 Da. In an embodiment, a small molecule does not include a polypeptide or nucleic acid including only natural amino acids and/or nucleotides.

As used herein, the term "subject" refers to living organisms, in particular, humans. In certain embodiments, the living organism is an animal, in certain preferred embodiments, the subject is a mammal, in certain embodiments, the subject is a domesticated mammal or a primate including a non-human primate. Examples of subject include humans, monkeys, dogs, cats, mice, rates, cows, horses, goats, and sheep. A human subject may also be referred to as a subject or patient.

As used herein, "superoxide dismutase" is understood as an enzyme that dismutation of superoxide into oxygen and hydrogen peroxide. Examples include, but are not limited to SOD1, SOD2, and SOD3. Sod1 and SOD3 are two isoforms of Cu—Zn-containing superoxide dismutase enzymes exists in mammals. Cu—Zn-SOD or SOD1, is found in the intracellular space, and extracellular SOD (ECSOD or SOD3) predominantly is found in the extracellular matrix of most tissues.

As used herein, the term "therapeutically effective amount," refers to an amount of an agent which is effective, upon single or multiple does administration to the cell or subject, in prolonging the survivability of the patient with such a disorder, reducing one or more signs or symptoms of the disorder, preventing or delaying and the like beyond that expected in the absence of such treatment.

An agent or other therapeutic intervention can be administered to a subject, either alone or in combination with one or more additional therapeutic agents or interventions, as a pharmaceutical composition in mixture with conventional excipient, e.g., pharmaceutically acceptable carrier, or therapeutic treatments.

The pharmaceutical agents may be conveniently administered in unit dosage form and may be prepared by any of the methods well known in the pharmaceutical arts, e.g., as described in Remington's Pharmaceutical Sciences (Mack Pub. Co., Easton, PA, 1985). Formulations for parenteral administration may contain as common excipients such as sterile water or saline, polyalkylene glycols such as polyethylene glycol, oils of vegetable origin, hydrogenated naphthalenes and the like. In particular, biocompatible, biodegradable lactide polymer, lactide/glycolide copolymer, or polyoxyethylene-polyoxypropylene copolymers may be useful excipients to control the release of certain agents.

The present invention is directed to the use of NACA to improve skin health, and/or prevent, reduce, or treat radiation-induced dermatitis, skin lightening, and/or whitening. In one embodiment, the present invention includes a method for use of N-acetylcysteine amide (NACA) or (2R,2R')-3, 3'-disulfanediyl bis(2-acetamidopropanamide) (diNACA) for the prevention and treatment of radiation dermatitis in a human that comprises administering to the human therapeutically effective amount of NACA. In some embodiments, the NACA is provided in or with a pharmaceutically acceptable carrier. In other embodiments, the NACA is administered intraocularly, subretinally, intravitreally, orally, intravenously, intramuscularly, topically, sublingually, or rectally.

It will be appreciated that the actual preferred amounts of active compounds used in a given therapy will vary according to e.g., the specific compound being utilized, the particular composition formulated, the mode of administration and characteristics of the subject, e.g., the species, sex, weight, general health and age of the subject. Optimal administration rates for a given protocol of administration can be readily ascertained by those skilled in the art using conventional dosage determination tests conducted with regard to the forgoing guidelines.

Ranges provided herein are understood to be shorthand for all of the values within the range.

As used herein, the embodiments of this invention are defined to include pharmaceutically acceptable derivatives thereof. A "pharmaceutically acceptable derivative" means any pharmaceutically salt, ester, salt of an ester, or other derivative of a compound of this invention which, upon administration to a recipient, is capable of providing (directly or indirectly) a compound of this invention. Particularly favored derivatives are those that increase the bioavailability of the compounds of this invention when such compounds are administered to a mammal (e.g., by allowing an orally administered compound to be more readily absorbed into the blood, to increase serum stability or decrease clearance rate of the compound) or which enhance delivery of the parent compound to a biological compartment (e.g., the brain or lymphatic system) relative to the parent species. Derivatives include derivatives where a group which enhances aqueous solubility or active transport through the gut membrane is appended to the structure of formulae described herein.

The embodiments of this invention may be modified by appending appropriate functionalities to enhance selective biological properties. Such modifications are known in the art and include those which increase biological penetration into a given biological compartment (e.g., blood, lymphatic system, central nervous system), increase oral availability, increase solubility to allow administration by injection, alter metabolism and alter rate of excretion. Pharmaceutically acceptable salts of the compounds of this invention include those derived from pharmaceutically acceptable inorganic and organic acids and bases. Examples of suitable acid salts include acetate, adipate, benzoate, benzenesulfonate, butyrate, citrate, digluconate, dodecylsulfate, formate, fumarate, glycolate, hemisulfate, heptanoate, hexanoate, hydrochloride, hydrobromide, hydroiodide, lactate, maleate, malonate, methanesulfonate, 2-napthalenesulfonate, nicotinate, nitrate, palmoate, phosphate, picrate, pivalate, propionate, salicylate, succinate, sulfate, tartrate, tosylate, and undeconaoate. Salts derived from appropriate bases include alkali metal (e.g., sodium), alkaline earth metal (e.g., magnesium), ammonium and N-(alkyl)4+ salts. This invention also envisions the quaternization of any basic nitrogencontaining groups of the compounds disclosed herein. Water or oil-soluble or dispersible products may be obtained by such quaternization.

The embodiments of the invention can, for example, be administered by injection, intraocularly, intravitreally, subretinal, intravenously, intraarterially, subdermally, intramuscularly, or subcutaneously; or orally, buccally, nasally, transmucosally, directly to a diseased organ by catheter, topically, or in an ophthalmic preparation, with a dosage ranging from about 0.001 to about 100 mg/kg of body weight, or according to the requirements of the particular drug and more preferably from 0.5-10 mg/kg of body weight. It is understood that when a compound is delivered directly to the eye, considerations such as body weight have less bearing on the dose.

Frequency of dosing will depend on the agent administered, the progression of the disease or condition in the subject, and other considerations known to those of skill in the art. For example, pharmacokinetic and pharmacodynamics considerations for compositions delivered to the eye, or even compartments within the eye, are different, e.g., clearance in the subretinal space is very low. Therefore, dosing can be as infrequent as once a month, once every three months, once every six months, once a year, once every five years, or less. If systemic administration of antioxidants is to be performed in conjunction with administration of expression constructs to the subretinal space, it is expected that the dosing frequency of the antioxidant will be higher than the expression construct, e.g., one or more times daily, one or more times weekly.

Figure 1:
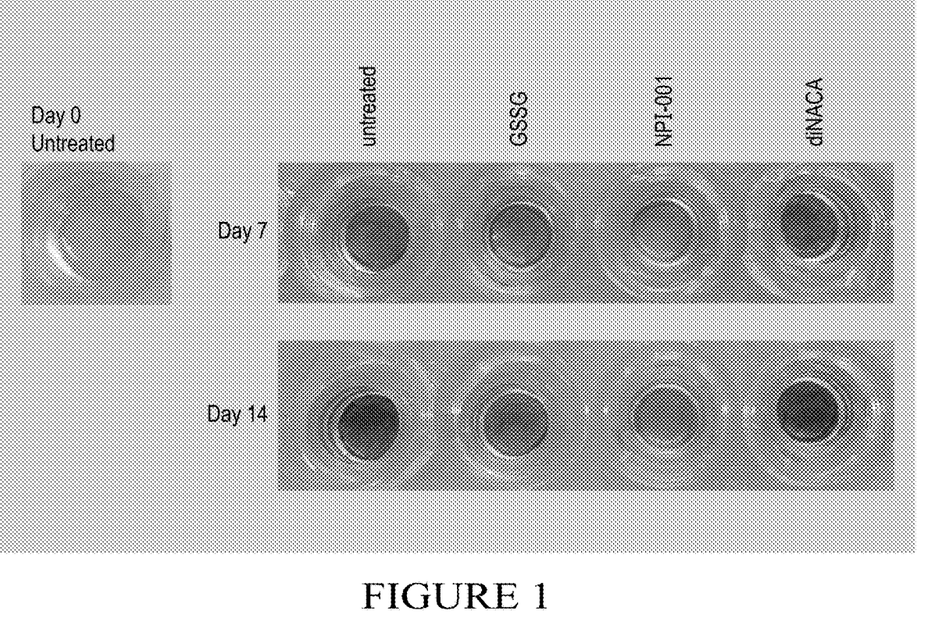
FIG. 1 shows that GSSG, NPI-001 (NACA) and NPI2 (diNACA) treatments decreased RHE Pigmentation.

FIG. 1 GSSG, NPI-001 and diNACA treatments decreased RHE Pigmentation.

Figure 2:
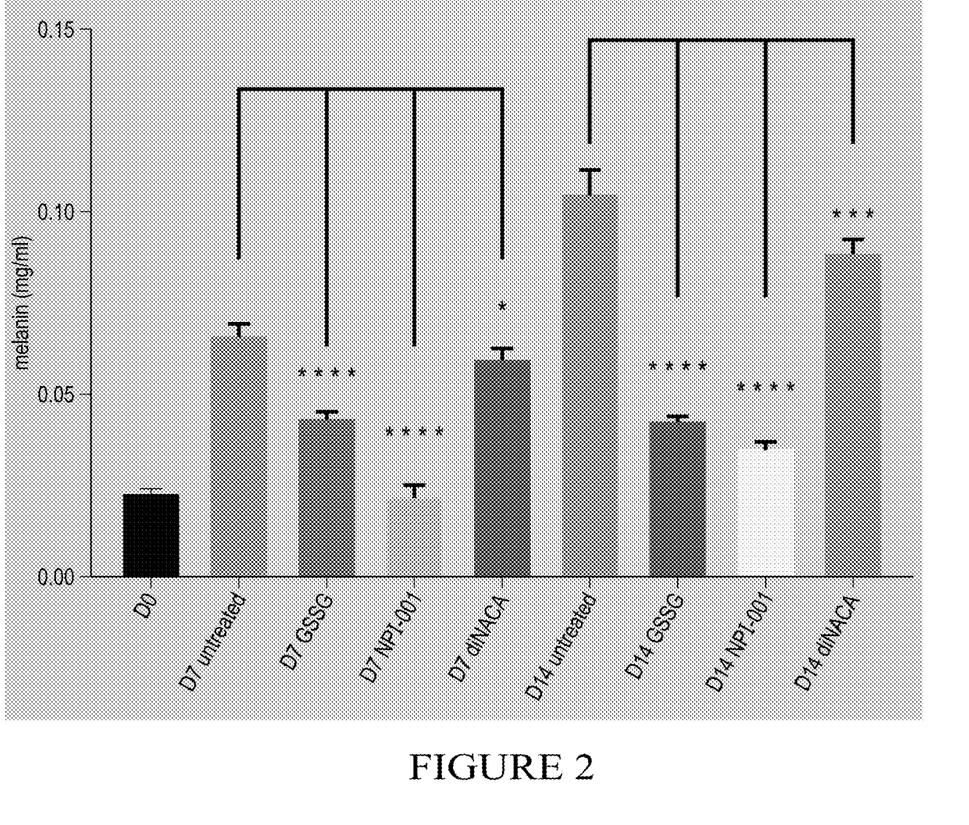
FIG. 2 is a graph that shows that GSSG, NPI-001 (NACA) and NPI2 (diNACA) treatments decreased melanin extraction.

FIG. 2 GSSG, NPI-001 and diNACA treatments decreased melanin extraction. Melanin (mg/ml) extracted from RHE after 0, 7, and 14 days with treatment. Error bars represent standard deviation. N-4 samples per treatment. Statistical analysis performed by one-way ANOVA with Dunnett's Multiple Comparisons compared to untreated control at relative day of harvest. [*P<0.05, P<0.01, *P<0.001, ****P<0.0001.].

Figure 3:
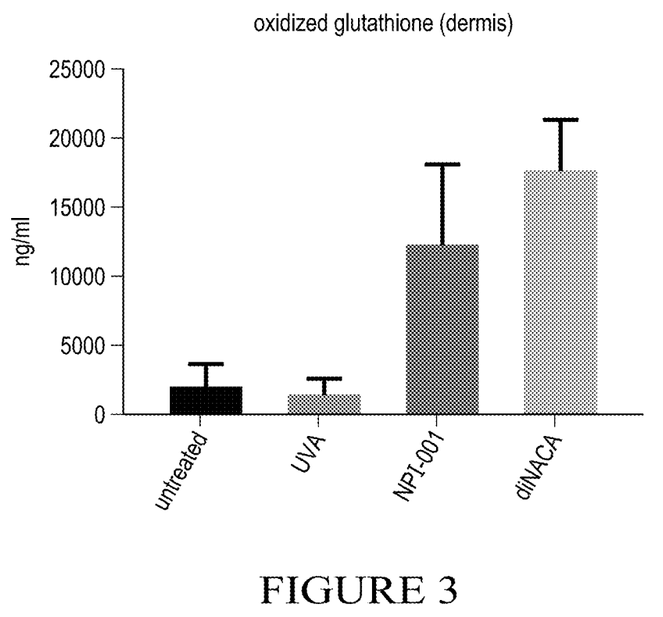
FIG. 3 is a graph that shows that NPI-001 (NACA) and (diNACA) increased levels of GSSG production in human skin exposed to UVA-induced oxidative skin damage.

FIG. 3. NPI-001 and diNACA increased levels of thiol production in human skin exposed to UVA-induced oxidative skin damage.

Reconstructed human epithelium (RHE) model to assess the ability of NPI-001 and NPI2 to decrease pigmentation in skin:

Reconstructed human epithelium (RHE) with melanocytes from African American descent were obtained from MatTek (MelanoDerm™ cat #MEL-300B). RHE were cultured for 14 days with reapplication of media with basolateral treatment every other day. Day 0, Day 7 and Day 14 RHE were photographed and frozen for melanin extraction.

After harvest of RHE on Day 14, cultures were submerged for 30 min in 1% sodium bicarbonate and transferred to Eppendorf tubes with 500 µl Solvable™ reagent for overnight incubation at 60° C. A synthetic melanin standard curve was made in Solvable™ reagent from 0.5-0.0039 mg/ml in half dilutions. 200 µl of extracted melanin was transferred to a 96 well plate and read at 490 nm for quantification. In summary:

NPI-001 (NACA 10 mM) successfully inhibited the pigmentation of MelanoDerm™ RHE cultures over 14 days to a greater extent than both the 2% GSSG and 10 mM diNACA treatments by both visual scoring and melanin extraction.

GSSG, NPI-001 (NACA 10 mM) and diNACA (10 mM) treatments significantly inhibited pigmentation compared to the relative day untreated control samples.

Effects of NPI-001 (NACA 10 mM) and diNACA (10 mM) on human skin explants upon radiation (UVA) exposure.

Light melanin human skin explant (single donor; n=6) in transwells were exposed to UVA radiation (24 J/cm2) with and without topical application of the NPI-001 and diNACA at a final concentration of 100 mM (NPI-001 16.2 mg/ml; diNACA 32.2 mg/ml) dissolved or suspended in 10% DMSO/water and applied at ~18 µl/cm2(~6 µl/0.33 cm2) 30 min prior to UVA exposure (24 J/cm2 exposure). 24 hours following UVA exposure tissue was harvested, cut in half and heat separated into epidermal and dermal layers; weighed; immediate submersion of the dermal and epidermal layers into a derivatization solution, analyzed by LCMS. Both NPI-001 and diNACA treatment 30 minutes prior to UVA caused statistically significant increases in dermal GSSG.

Dosing may be determined in conjunction with radiation dermatitis, radiation damage to the skin, skin lightening, whitening or to improve skin health. The amount of active ingredient that may be combined with the carrier materials to produce a single dosage form will vary depending upon the host treated and the particular mode of administration. A typical preparation will contain from about 1% to about 95% active compound (w/w). Alternatively, such preparations contain from about 20% to about 80% active compound. Lower or higher doses than those recited above may be required. Specific dosage and treatment regimens for any particular patient will depend upon a variety of factors, including the activity of the specific compound employed, the age, body weight, general health status, sex, diet, time of administration, rate of excretion, drug combination, the severity ad course of the disease, condition or symptoms, the patient's disposition to the disease, condition or symptoms and the judgment of the treating physician.

In another aspect, NACA or diNACA may be useful agents in a topical product, e.g, a sunscreen product, thereby acting to protect skin cells from radiation damage. NACA or diNACA could be used alone, or in combination with each other or other agents in a sunscreen product.

In another aspects, NACA or diNACA may be useful agents to treat xeroderma pigmentosa or protect patients with xeroderma pigmentosa from skin damage caused by exposure to the sun or other radiation In another aspect NACA or diNACA may be useful in prevention or treatment of the effects of agents that cause skin damage attributed to oxidative stress in the skin. This includes, but is not limited to, bioweapons, chemical burns, heat burns, contact damage caused by friction, contact dermatitis, hypersensitivity reactions and skin wrinkles and dehydration.

The pharmaceutical compositions may be in the form of a sterile injectable preparation, for example, as a sterile injectable aqueous or oleaginous suspension. This suspension may be formulated according to techniques known in the art using suitable dispersing or wetting agents (such as, for example, TWEEN® 80) and suspending agents. The sterile injectable preparation may also be a sterile injectable solution or suspension in a non-toxic parenterally acceptable diluent or solvent, for example, as a solution in 1,3-butanediol. Among the acceptable vehicles and solvents that may be employed are mannitol, water, Ringer's solution and isotonic sodium chloride solution. In addition sterile, fixed oils are conventionally employed as a solvent or suspending medium. For this purpose, any bland fixed oil may be employed including synthetic mono- or diglycerides. Fatty acids, such as oleic acid and its glyceride derivatives are useful in the preparation of injectables, as are natural pharmaceutically-acceptable oils, such as olive oil or castor oil, especially in their polyoxyethylated versions. These oil solutions or suspensions may also contain a long-chain alcohol diluent or dispersant, or carboxymethyl cellulose or similar dispersing agents which are commonly used in the formulation of pharmaceutically acceptable dosage forms such as emulsions and or suspensions. Other commonly used surfactants such as TWEENs® or SPAN® and/or other similar emulsifying agents or bioavailability enhancers which are commonly used in the manufacture of pharmaceutically acceptable solid, liquid, or other dosage forms may also be used for the purposes of formulation.

In one or more embodiments, NAC, NACA or diNACA is administered in daily doses of about 0.5 to 150 mg/Kg. In other embodiments, NACA is administered two or three times daily. In another aspect, NAC, NACA or diNACA is administered with a second active agent selected from ascorbic acid, cysteine hydrochloride, sodium bisulfate, sodium metabisulfite, sodium sulfite and the like; oil-soluble antioxidants, such as ascorbyl palmitate, butylated hydroxyanisole (BHA), butylated hydroxytoluene (BHT), lecithin, propyl gallate, α-tocopherol, and the like; and metal chelating agents, such as citric acid, ethylenediamine tetraacetic acid (EDTA), sorbitol, tartaric acid, phosphoric acid, and the like.

In some embodiments, the dose of NAC, NACA or diNACA for administration is, 100, 150, 150, 300, 333, 400, 500, 600, 700, 750, 800, 900, 1,000, 2,500, 5,000, 7,500, or 10,000 mg per dose. In another aspect, the dose for administration is 0.1-0.25, 0.1-0.4, 0.35-0.5, 0.5-1, 102, 1-3, 1-4, 1-5, 1-2.5, 2.5-3.5, 4-6, 5-8, 6-9, 7-10 grams per dose. In another aspect, the NAC, NACA or diNACA is delivered orally via a mini-tablet, capsule, tablet, effervescent, dual release, mixed release, sachet, powder, or liquid. In another aspect, the NACA is administered prophylactically to improve skin health, and/or prevent, reduce, or treat radiation induced dermatitis, skin lightening, and/or whitening.

In another embodiment, the present invention includes a method for the treatment of radiation-induced dermatitis, skin lightening, and/or whitening and to improve skin health comprising: identifying a human in need of treatment for age-related macular degeneration; and administering to the human a therapeutically effective amount of NAC, NACA or diNACA sufficient to treat improve skin health, and/or prevent, reduce, or treat radiation induced dermatitis, skin lightening, and/or whitening. It will be understood that, as with the other embodiments defined above, NAC, NACA or diNACA is administered in daily doses of about 0.5 to 150 mg/Kg. In another aspect, NAC, NACA or diNACA is administered two or three times daily. In another aspect, NACA is administered with a second active agent as disclosed above.

In another aspect, the dose of NAC, NACA or diNACA for administration is 100, 150, 150, 300, 333, 400, 500, 600, 700, 750, 800, 900, 1,000, 2,500, 5,000, 7,500, or 10,000 mg per dose. In another aspect, the dose for administration is 0.1-0.25, 0.1-0.4, 0.35-0.5, 0.5-1, 102, 1-3, 1-4, 1-5, 1-2.5, 2.5-3.5, 4-6, 5-8, 6-9, 7-10 grams per dose. In another aspect, the NAC, NACA or diNACA is delivered orally via a mini-tablet, capsule, tablet, effervescent, dual release, mixed release, sachet, powder, or liquid. In another aspect, NACA is administered prophylactically to prevent improve skin health, and/or prevent, reduce, or treat radiation induced dermatitis, skin lightening, and/or whitening.

As used herein, "susceptible to" or "prone to" or "predisposed to" a specific disease or condition or the like refers to an individual who based on genetic, environmental, health, and/or other risk factors is more likely to develop a disease or condition than the general population. An increase in likelihood of developing a disease may be an increase of about 10%, 20%, 50%, 100%, 150%, 200% or more.

In accordance with an embodiment, the present invention provides a method for the use of N-acetylcysteine (NAC), N-acetylcysteine amide (NACA) or (2R,2R')-3,3'-disulfanediyl bis(2-acetamidopropanamide) (diNACA) for the prevention and/or treatment of at least one of: radiation dermatitis, radiation damage to the skin, skin lightening, whitening or to improve skin health in an animal or human that comprises, consisting essentially or, consisting of: administering to the animal or human a therapeutically effective amount of N-acetylcysteine amide NAC, NACA, or diNACA. In one aspect, the NAC, NACA or diNACA is provided in or with a pharmaceutically acceptable carrier. In another aspect, the NACA is administered intraocularly, subretinally, intravitreally, orally, intravenously, intramuscularly, topically, sublingually, by injection into the skin, or rectally. In another aspect, the NAC, NACA or diNACA is administered in daily doses of about 0.5 to 150 mg/Kg. In another aspect, NAC, NACA or diNACA is administered two or three times daily. In another aspect, NAC, NACA or diNACA is administered with a second active agent selected from at least one of ascorbic acid, cysteine hydrochloride, sodium bisulfate, sodium metabisulfite, sodium sulfite, ascorbyl palmitate, butylated hydroxyanisole (BHA), butylated hydroxytouene (BHT), lecithin, propyl gallate, α-tocopherol, citric acid, ethylenediamine tetraacetic acid (EDTA), sorbitol, tartaric acid, or phosphoric acid. In another aspect, the dose for administration is 100, 150, 150, 300, 333, 400, 500, 600, 700, 750, 800, 900, 1,000, 2,500, 5,000, 7,500, or 10,000 mg per dose. In another aspect, the does for administration is 0.1-0.25, 0.1-0.4, 0.35-0.5, 0.5-1, 1-2, 1-3, 1-4, 1-5, 1-2.5, 2.5-3.5, 4-6, 5-8, 6-9, 7-10 grams per dose. In another aspect, the NACA is delivered orally via a mini-tablet, capsule, tablet, effervescent, dual release, mixed release, sachet, powder, or liquid. In another aspect, the NACA is administered prophylactically to prevent and/or treat radiation dermatitis, skin lightening, whitening or to improve skin health. In another aspect, the animal is a human. In one aspect, the method further comprising adding a topical agent to protects skin cells from radiation damage. In one aspect, the method further comprising adding an active agent for the treatment of xeroderma pigmentosa or protect that protects the skin of patients with xeroderma pigmentosa from skin damage caused by exposure to sun or other radiation. In one aspect, the method further comprising adding an active agent for the treatment of bioweapons, chemical burns, heat burns, contact damage caused by friction, contact dermatitis, hypersensitivity reactions and skin wrinkles and dehydration.

In accordance with another embodiment, the present invention includes a method for the prevention and/or treatment of radiation dermatitis, skin lightening, whitening or to improve skin health comprising, consisting essentially or, consisting of: identifying a human in need of prevention and/or treatment of radiation dermatitis, skin lightening, whitening or to improve skin health; and administering to the human a therapeutically effective amount of NAC, NACA or diNACA sufficient to prevent and/or treat the radiation dermatitis, skin lightening, whitening or to improve skin health. In one aspect, the NAC, NACA or diNACA is provided in or with a pharmaceutically acceptable carrier. In another aspect, the NAC, NACA or diNACA is administered intraocularly, subretinally, intravitreally, orally, intravenously, intramuscularly, topically, sublingually, cutaneously, subcutaneously, by injection into the skin, or rectally. In another aspect, the NAC, NACA or diNACA is administered in daily doses of about 0.5 to 150 mg/Kg. In another aspect, NAC, NACA or diNACA is administered two or three times daily. In another aspect, NAC, NACA or diNACA is administered with a second active agent selected from at least one of ascorbic acid, cysteine hydrochloride, sodium bisulfate, sodium metabisulfite, sodium sulfite, ascorbyl palmitate, butylated hydroxyanisole (BHA), butylated hydroxytouene (BHT), lecithin, propyl gallate, α-tocopherol, citric acid, ethylenediamine tetraacetic acid (EDTA), sorbitol, tartaric acid, or phosphoric acid. In another aspect, the dose for administration is 100, 150, 150, 300, 333, 400, 500, 600, 700, 750, 800, 900, 1,000, 2,500, 5,000, 7,500, or 10,000 mg per dose. In another aspect, the does for administration is 0.1-0.25, 0.1-0.4, 0.35-0.5, 0.5-1, 1-2, 1-3, 1-4, 1-5, 1-2.5, 2.5-3.5, 4-6, 5-8, 6-9, 7-10 grams per dose. In another aspect, the NAC, NACA or diNACA is delivered orally via a mini-tablet, capsule, tablet, effervescent, dual release, mixed release, sachet, powder, or liquid. In another aspect, the NAC, NACA or diNACA is administered prophylactically to prevent and/or treat radiation dermatitis, skin lightening, whitening or to improve skin health. In one aspect, the method further comprising adding a topical agent to protects skin cells from radiation damage. In one aspect, the method further comprising adding an active agent for the treatment of xeroderma pigmentosa or protect that protects the skin of patients with xeroderma pigmentosa from skin damage caused by exposure to sun or other radiation. In one aspect, the method further comprising adding an active agent for the treatment of bioweapons, chemical burns, heat burns, contact damage caused by friction, contact dermatitis, hypersensitivity reactions and skin wrinkles and dehydration.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase" consisting essentially of" requires the specified integer(s) or steps as well as those that do not materially affect the character or function of the claimed invention. As used herein, the term "consisting" issued to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refer condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

Additionally, the section headings herein are provided for consistency with the suggestions under 37 CFR 1.77 or otherwise to provide organization cues. These headings shall not limit or characterize the invention(s) set out in any claims that may issue from this disclosure. Specifically and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method for use of (2R,2R')-3,3'-disulfanediyl bis(2-acetamidopropanamide) (diNACA) to reduce melanocyte activity in a human subject that comprises:
   identifying a human patient in need of skin lightening or whitening; and
   administering to the human patient a therapeutically effective amount of diNACA sufficient to reduce melanocyte activity.

2. The method of claim 1, wherein the diNACA is provided in or with a pharmaceutically acceptable carrier.

3. The method of claim 1, wherein the diNACA is administered orally, intravenously, intramuscularly, intranasally, enterally, intraocularly, subretinally, intravitreally, topically, ocularly, sublingually, cutaneously, subcutaneously, or rectally.

4. The method of claim 1, wherein the diNACA is administered in daily doses of about 0.5 to 150 mg/Kg.

5. The method of claim 1, wherein the diNACA is administered two or three times daily.

6. The method of claim 1, wherein the diNACA is administered with a second active agent.

7. The method of claim 1, wherein the diNACA is administered with a second active agent selected from at least one of ascorbic acid, cysteine hydrochloride, sodium bisulfate, sodium metabisulfite, sodium sulfite, ascorbyl palmitate, butylated hydroxyanisole (BHA), butylated hydroxytoluene (BHT), lecithin, propyl gallate, α-tocopherol, citric acid, ethylenediamine tetraacetic acid (EDTA), sorbitol, tartaric acid, or phosphoric acid.

8. The method of claim 1, wherein the dose for administration is 100, 150, 300, 333, 400, 500, 600, 700, 750, 800, 900, 1,000, 2,500, 5,000, 7,500, or 10,000 mg per dose.

9. The method of claim 1, wherein the diNACA is delivered orally via a mini-tablet, capsule, tablet, effervescent, dual release, mixed release, sachet, powder, or liquid.

10. The method of claim 1, wherein a therapeutically effective amount of 100, 150, 300, 333, 400, 500, 600, 700, 750, 800, 900, 1,000, 2,500, 5,000, 7,500, or 10,000 mg decreases at least one of the loss of night vision, the loss of overall visual acuity, the loss of visual field, by at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or more as compared to an untreated control subject over a defined period of time, selected from at least one of 2 weeks, one month, 2 months, 3 months, 6 months, one year, 2 years, or 5 years.

11. A method for use of (2R,2R')-3,3'-disulfanediyl bis(2-acetamidopropanamide) (diNACA) for at least one of: skin lightening or whitening, in a human subject that comprises:
   administering to the human patient a therapeutically effective amount of diNACA.

12. The method of claim 11, wherein the diNACA is provided in or with a pharmaceutically acceptable carrier.

13. The method of claim 11, wherein the diNACA is administered orally, intravenously, intranasally, intramuscularly, enterally, intraocularly, subretinally, intravitreally, topically, ocularly, sublingually, cutaneously, subcutaneously, or rectally.

14. The method of claim 11, wherein the diNACA is administered in daily doses of about 0.5 to 150 mg/Kg.

15. The method of claim 4, wherein the diNACA is administered two or three times daily.

16. The method of claim 11, wherein the diNACA is administered with a second active agent.

17. The method of claim 11, wherein the dose for administration is 100, 150, 300, 333, 400, 500, 600, 700, 750, 800, 900, 1,000, 2,500, 5,000, 7,500, or 10,000 mg per dose.

* * * * *